Figure 1:
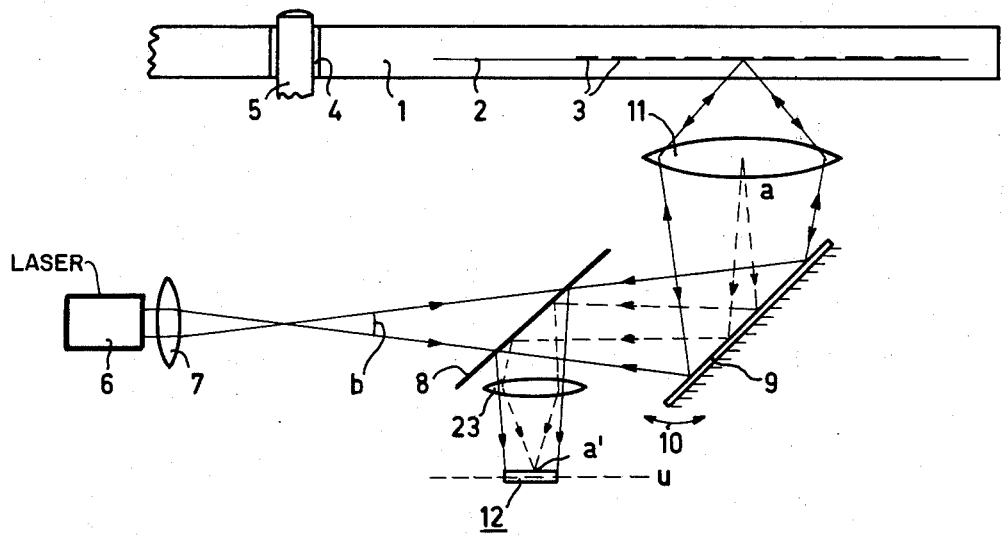

United States Patent [19]

Braat

[11] 4,057,833

[45] Nov. 8, 1977

[54] CENTERING DETECTION SYSTEM FOR AN APPARATUS FOR PLAYING OPTICALLY READABLE RECORD CARRIERS

[75] Inventor: Josephus Johannes Maria Braat, Eindhoven, Netherlands

[73] Assignee: U.S. Philips Corporation, New York, N.Y.

[21] Appl. No.: 669,639

[22] Filed: Mar. 23, 1976

Related U.S. Application Data

[63] Continuation-in-part of Ser. No. 530,165, Dec. 6, 1974, Pat. No. 3,962,720.

[30] Foreign Application Priority Data

Jan. 28, 1976 Netherlands .......................... 7600842

[51] Int. Cl.² .......................... H04N 5/76; G11B 7/12
[52] U.S. Cl. .............................. 358/128; 179/100.3 V; 179/100.3 G
[58] Field of Search .......... 178/6.6 R, 6.6 DD, 6.7 A; 179/100.3 V, 100.3 G, 100.3 M, 100.3 D, 100.3 R, 100.41 D, 100.41 L; 250/201, 202; 358/128

[56] References Cited

U.S. PATENT DOCUMENTS

| 3,876,841 | 4/1975 | Kramer | 179/100.3 V |
| 3,876,842 | 4/1975 | Bouwhuis | 179/100.41 L |
| 3,962,720 | 6/1976 | Braat | 178/6.6 R X |

*Primary Examiner*—John H. Wolff
*Attorney, Agent, or Firm*—Frank R. Trifari; Simon L. Cohen

[57] ABSTRACT

An apparatus as described for reading a record carrier on which information, for example video and/or audio information is stored in an optically readible track-shaped information structure. A deviation between the center of a read spot which is projected on the information structure and the center line of a track to be read can be detected with the aid of at least two detectors which are disposed in the far field of the information structure in different quadrants. With the aid of the same detectors a reference signal is obtained which is used for deriving a control signal for correcting the position of the read spot relative to the track to be read.

6 Claims, 9 Drawing Figures

CENTERING DETECTION SYSTEM FOR AN APPARATUS FOR PLAYING OPTICALLY READABLE RECORD CARRIERS

This is a continuation in part application of applicant's previous application Ser. No. 530,165, filed Dec. 6, 1974, and now U.S. Pat. No. 3,962,720.

The invention relates to apparatus for reading a record carrier on which information, for example video and/or audio information, is stored in an optically readable track-shaped information structure, which apparatus comprises a radiation source, an objective system for passing radiation emitted by the radiation source to a radiation-sensitive information detection system via the record carrier, which detection system converts a read beam which is supplied by the radiation source and modulated by the information structure into an electrical signal, and which apparatus furthermore comprises a centering detection system which is connected to an electrical circuit for deriving a control signal for correcting the centering of the read beam relative to a track portion to be read.

A centering detection system is to be understood to mean a radiation-sensitive detection system which supplies an electrical signal which provides an indication about the deviation between the center of a read spot of radiation which is projected on the record carrier and the center of a track portion to be read.

In "Philips' Technical Review" 33 No. 7, pages 186–189, an apparatus for reading a disc-shaped round record carrier is described. On this record carrier a color television program is stored. The information structure comprises a spiral track which consists of a multitude of pits which are pressed into the record carrier, the luminance information being contained in the frequency of the pits, while the chrominance and audio information is contained in a variation of the lengths of the pits. At the information structure a read beam is focused to a radiation spot whose dimensions are of the order of magnitude of those of the pits. By moving the record carrier relative to the read beam, this beam is modulated in accordance with the stored information. A radiation-sensitive information detection system converts the modulation of the read beam into an electrical signal. In an electronic circuit the signal is processed so that it is suitable to be applied to color television receiving apparatus.

When reading the record carrier care must be taken that the center of the read spot of radiation is always projected in the center of the track to be read, because otherwise the modulation depth of the signal supplied by the information detection system becomes too small and crosstalk may occur between adjacent tracks. Therefore, the position of the radiation spot will have to be detected and corrected continually.

For this purpose the apparatus described in the cited article comprises an auxiliary system with which two sub-beams are produced, which are focussed at the edge of a track portion to be read. For each of the sub-beams a separate auxiliary detector is provided. The difference between the output signals of these auxiliary detectors provides an indication of the degree of centering of the read beam relative to a track portion to be read. In addition to the optical elements required for the actual read-out, the known apparatus comprises a number of optical auxiliary elements necessary for detecting a centering error.

It is an object of the present application to provide a read apparatus in which centering errors can be detected using a minimum number of additional optical elements. The apparatus in accordance with the invention is therefore characterized in that the centering detection system and the information detection system are constituted by an even number of at least two and at most four radiation-sensitive detectors which are situated in the far field of the information structure in the individual quadrants of an imaginary X-Y coordinate system whose origin is disposed on the optical axis of the objective system and whose X-axis effectively extends in the track direction and whose Y-axis effectively extends transversely to the track direction, that the outputs of two detectors which are disposed at the same side of the Y-axis are connected to both a subtractor circuit and an adder circuit, that a multiplier circuit is provided to whose inputs signals derived from the subtractor circuit and from the adder circuit are applied and that the output of the multiplier circuit is connected to a filter circuit which only transmits frequencies lower than the frequency which corresponds to twice the average spatial frequency of the information structure in the track direction, at the output of which filter circuit a control signal for correcting the centering of the read beam is obtained.

The phrase "the detectors are situated in the far field of the information structure" is to be understood to mean that these detectors are located in a plane in which the different diffraction orders of the read beam formed by the information structure are sufficiently distinct; i.e. in a plane which is sufficiently far from the image of the information structure.

The phrase: "that the X-axis effectively extends in the track direction and the Y-axis effectively extends transversely to the track direction", is to be understood to mean that the imaginary projections of these axes on the information structure extend in the track direction and transversely to the track direction respectively.

The invention is based on the recognition that when reading the information structure, which behaves as a two-dimensional diffraction grating, centering errors result in additional phase shifts between a zero-order sub-beam and higher order sub-beams. These phase shifts can be detected in the far field of the information structure with the aid of suitably arranged detectors. In accordance with the invention, a reference signal is obtained with the aid of the same detectors, which signal is employed for deriving the control signal for correcting the centering of the read spot relative to a track portion to be read. The advantage of this is that the reference signal and the signal which provides an indication of centering errors are affected in the same way by possible disturbances in the read system, such as optical noise or vibrations of the elements in the read apparatus. Owing to the manner in which said signals are processed, namely via so-called synchronous detection, the resulting control signal for centring correction is independent of said disturbances.

A further advantage is that the applicability of the invention is not limited to one specific phase depth of the information structure. Phase depth is to be understood to mean the phase difference between the zero-order sub-beam and the first order sub-beams caused by the details of the information structure. If the information structure is reflecting and consists of pits which are pressed into the record carrier surface, which pits are $\lambda/4$ deep. $\lambda$ being the wavelength of the read beam, the phase depth is $\pi$. The invention is also applicable to amplitude structures whose phase depths may be assumed to be also $\pi$.

However, the selected phase depth of the information structure does dictate how the actual information is preferably read, i.e. whether the sum of the output signals of the detectors at one side of the Y-axis should be added to or subtracted from the sum of the output signals of the detectors at the other side of the Y-axis.

In principle, the concept underlying the invention can be implemanted using two detectors only. By using four detectors a better signal-noise ratio can be obtained for the information signal and for the centering error signal.

It is to be noted that it has been proposed previously in the Applicant's U.S. Pat. No. 4,006,293 to detect centering errors with the aid of one additional detector which is disposed in the far field of the information structure. Alternatively, two additional detectors may be used. However, the last-mentioned detectors are situated in the same quadrants of the above-mentioned imaginary coordinate system, and the output signals of these detectors are not subtracted from each other for determing a centering error. For a dynamic detection of the centering errors in the previously proposed read apparatus the track portion to be read and the read spot should periodically be moved relative to each other transversely to the track direction during reading. This demands an adaptation of either the record carrier or the read apparatus.

Figure 2:
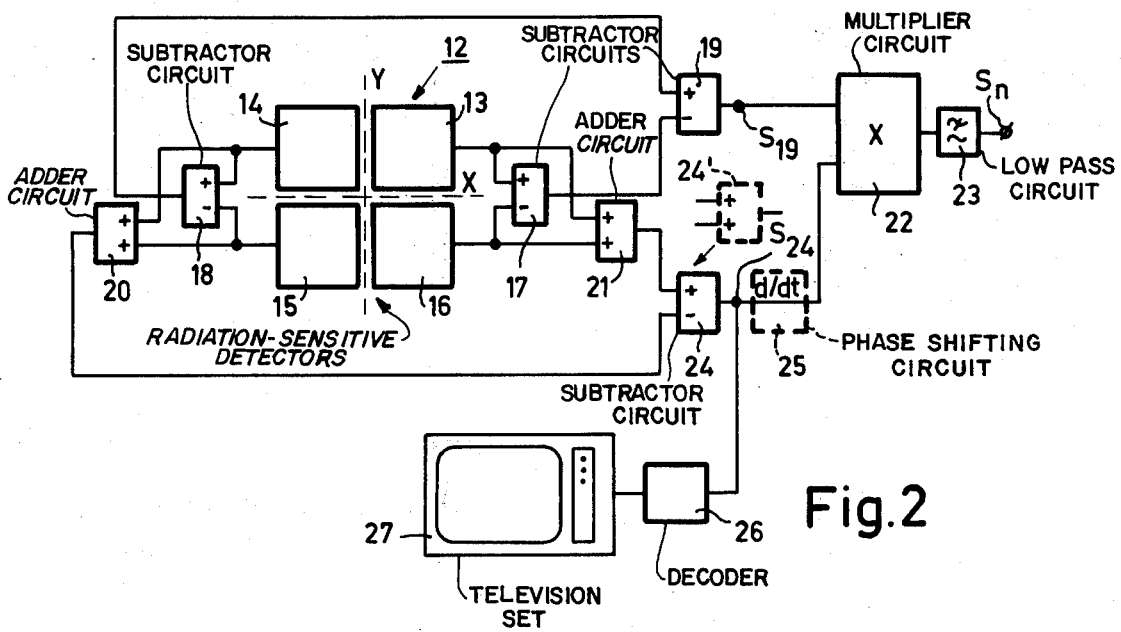
Figure 3:
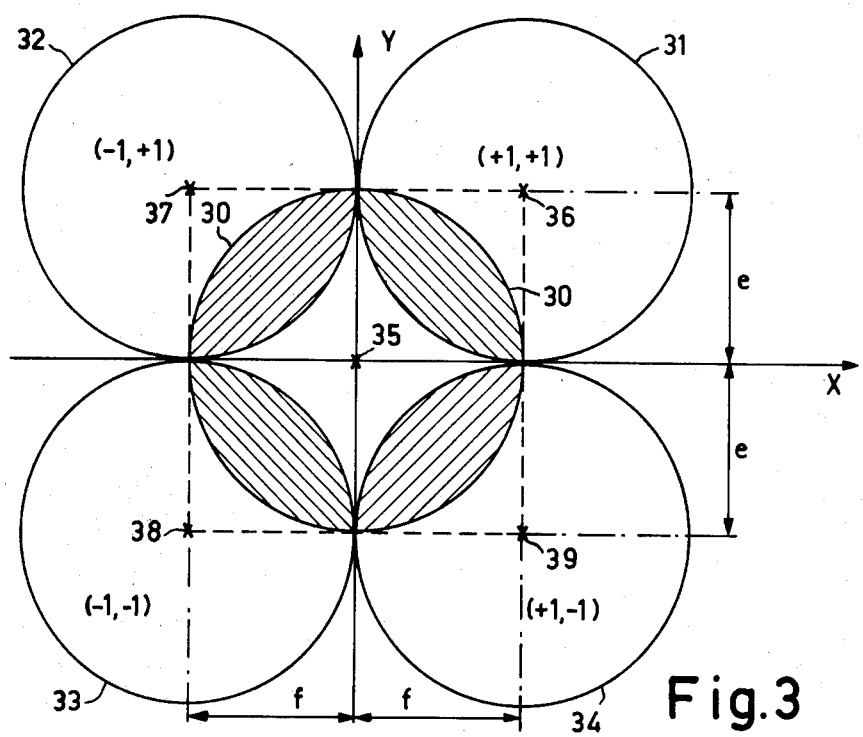
Figure 4:
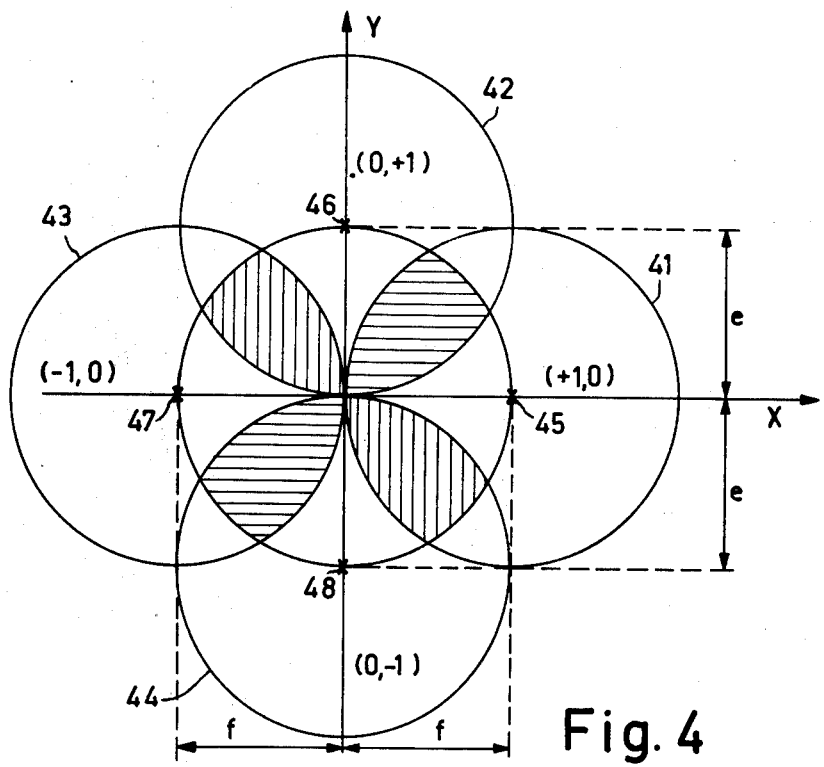
Figure 5:
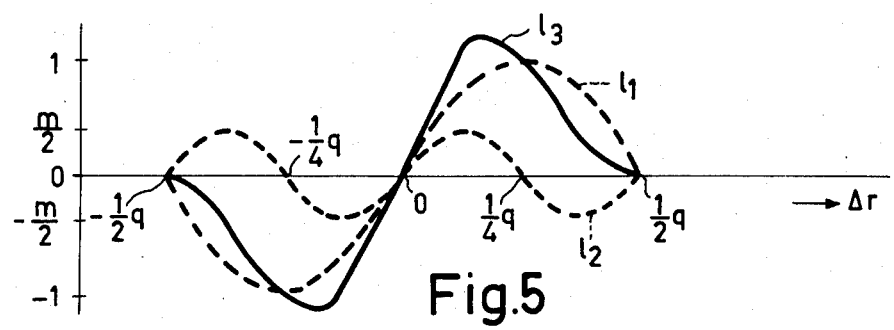

The invention will now be described in more detail with reference to the drawing, in which:

FIG. 1 shows an embodiment of an apparatus in accordance with the invention,

FIGS. 2, 6, 6a 7 and 8 show examples of radiation-sensitive detection systems employed in this apparatus, and they also illustrate how the signals supplied by these systems are processed, and FIGS. 3, 4 and 5 illustrate the principle of the invention.

FIG. 1 shows a round disc-shaped record carrier 1 in radial cross-section. The information structure is assumed to be reflecting. The information tracks are designated 3. A radiation source 6, for example a helium-neon laser, emits a read beam $b$. The mirror 9 reflects this beam towards an objective system 11, which is schematically represented by a single lens. The path of the read beam $b$ includes an auxiliary lens 7, which ensures that the read beam completely fills the pupil of the objective system. Then, a radiation spot of minimal dimensions is formed on the plane 2 of the information structure.

The read beam is reflected by the information structure and during rotation of the record carrier about a spindle 5 which extends through a central opening 4, it is time modulated in accordance with the information stored in the track to be read. The modulated read beam passes again through the objective system and is reflected by the mirror 9 in the direction of the beam which is emitted by the source. The radiation path of the read beam includes elements for separating the paths of the modulated and the unmodulated read beam. These elements may for example comprise an assembly of a polarization sensitive dividing prism and a $\lambda/4$ plate. For the sake of simplicity it is assumed in FIG. 1 that said means are constituted by a semi-transparent mirror 8. This mirror reflects a part of the modulated read beam to a radiation sensitive detection system 12.

The optical details of the information structure are very small. For example, the width of a track is 0.5 $\mu$m, the track distance 1.2 $\mu$m, and the average period of the information areas, which are assumed to be pits, hereinafter is 3 $\mu$m for a disc-shaped record carrier on which a 30-minute television program is stored within a ring with an inner diameter of 12cm and an outer diameter of 27 cm. Therefore, the read spot should remain very accurately centered on the track to be read.

In order to enable centering errors to be detected, in accordance with the invention, the detection system 12 consists of for example four radiation-sensitive detectors, as is shown in FIG. 2, The four detectors 13, 14, 15 and 16 are disposed in four different quadrants of an X-Y coordinate system. If a track portion to be read is projected on the detection system the longitudinal direction and the lateral direction of the track portion are parallel to the X-axis and the Y-axis respectively.

The four detectors are for example disposed in the plane U in which an image of the exit pupil of the objective system is formed by means of an auxiliary lens 23. For the sake of simplicity only the image ($a'$) of a point $a$ of the exit pupil is shown by dashed lines in FIG. 1. The detectors 13, 14, 15, and 16 may also be disposed in an other plane, provided that the sub-beams which are different in various orders by the information structure are sufficiently distinct.

As is further shown in FIG. 2, the output signals of the detectors 13 and 16 are subtracted from each other by means of the subtractor circuit 17 and the output signals of the detectors 14 and 15 by means of the subtractor circuit 18. The output signals of the subtractor circuits 17 and 18 are subtracted from each other in the subtractor circuit 19. The output of this circuit is connected to one of the inputs of a multiplier circuit 22. The output signal of the circuit 22 is applied to a low-pass filter 23. At the output of this filter the desired signal $S_r$ is obtained, as will be explained hereinafter.

For reading the information contained on the record carrier, for example a television program, the output signals of the detectors 13 and 16 can be added to each other with the aid of the adder circuit 21 and the output signals of the detectors 14 and 15 by means of the adder circuit 20. The output signals of the adder circuits 20 and 21 can be subtracted from each other in the circuit 24. The information signal $S_{24}$, which appears at the output of the subtractor circuit 24, is decoded in an electronic circuit 26, known per se, and the decoded signal, if a television program is stored, is rendered visible and audible with the aid of conventional television receiving apparatus 27. Furthermore, the signal $S_{24}$ is applied to a second input of the multiplier circuit 22.

Now the physical backgrounds of the invention will be discussed in further detail. The information structure of the record carrier, which information structure consists of tracks which in their turn comprise a multitude of areas and intermediate areas, of which the areas may take the form of pits, may be regarded as a two-dimensional diffraction grating. This grating divides the read beam $b$ into a zero order sub-beam, a number of first order sub-beams and a number of higher order sub-beams. A part of the radiation of the sub-beams passes through the pupil of the objective system 11 and could be concentrated in the image plane of the information structure. In this image plane the individual diffraction orders are not separated. However, in the plane of the exit pupil of the objective system, or in a plane in which an image of said exit pupil is formed, the diffraction orders are more or less separated. FIGS. 3 and 4 show the situation in the plane of the exit pupil.

In FIG. 3 the circle 30 with the center 35 represents the cross-section of the zero order sub-beam $b(0, 0)$ in the plane of the exit pupil of the objective system. The circles 31, 32, 33, and 34 respectively represent the cross-sections of the diagonally diffracted sub-beams $b(+1, +1)$, $b(-1, +1)$, $b(-1, -1)$, and $b(+1, -1)$.

Besides in the diagonal directions, the information structure also diffracts the read beam in the track direction and in the direction transverse to the track direction. Hence, also $(+1, 0)$ and $(-1, 0)$ order sub-beams are obtained solely owing to the pits in a track portion to be read, and also $(0, +1)$ and $(0, -1)$ order sub-beams solely owing to the grating structure transverse to the track direction. In FIG. 4 the circles 41, 42, 43 and 44 represent the cross-sections of the sub-beams $b(+1, 0)$, $b(0, 1)$, $b(-1, 0)$, and $b(0, -1)$ at the location of the exit pupil of the objective system.

The X-axis and the Y-axis of FIG. 3 and 4 correspond to the X-axis and the Y-axis of FIG. 2. The distance $e$ from the centers 36, 37, 38, 39, 46 and 48 of the circles 31, 32, 33, 34, 42 and 44 to the X-axis is determined by $\lambda/q$, where $q$ is the spatial period of the information structure in the direction transverse to the track direction and $\lambda$ the wavelength of the read beam $b$. The period $q$ may be assumed to be constant. The distance $f$ from the centers 36, 37, 38, 39, 45 and 47 to the Y-axis is determined by $\lambda/p$, $p$ representing the local spatial period of the pits in a track portion to be read.

For determining a centering error use is made of the changes in phase of the first-order diagonal sub-beams relative to the zero order sub-beam.

In the hatched areas in FIG. 3 the various first-order diagonal sub-beams $b(+1, +1)$, $b(-1, +1)$, $b(-1, -1)$, and $b(+1, -1)$ overlap the zero-order sub-beam $b(0, 0)$ and interference occurs. The phase of the first-order diagonal sub-beams varies with high frequency owing to the movement of the read spot over the information structure in the track direction, and with low frequency owing to a possible movement of the read spot in a direction transverse to the track direction. This gives rise to intensity variations in the exit pupil, or the effective exit pupil, of the objective system, which variations can be detected with for example the detector arrangement of FIG. 2.

When the center of the read spot coincides with the center of a pit, a specific phase difference $\Psi$ is obtained between a first-order sub-beam and a zero-order sub-beam. The value of $\Psi$ depends on the shape of the information structure, in the case of a pit structure it depends mainly on the phase depth of the pits. When the read spot moves from a first pit to a second pit the phase of for example the first-order sub-beam $b(+1, +1)$ relative the zero-order beam increases continuously with $2\pi$. Therefore it may be assumed that as the read spot moves in the track direction the phase of the first-order sub-beam $b(+1, +1)$ relative to the zero order sub-beam changes by $\omega t$. Here, $\omega$ is a temporal frequency which is determined by the spatial frequency of the pits in a track portion to be read and by the speed with which the read spot moves over this track portion. Also in the case of a movement of the read spot transverse to the track direction the phase of the first-order sub-beam $b(+1, +1)$ relative to the zero-order sub-beam will change. This phase shift may be represented by $2\pi \Delta r/q$, where $\Delta r$ is the distance between the center of the read spot and the center of the track portion to be read.

The phase $\phi (+1, +1)$ of the various diagonal first-order sub-beams relative to the zero order sub-beam may consequently be represented by:

$$\phi(+1, +1) = \Psi + \omega t + 2\pi \Delta r/q$$

$$\phi(-1, +1) = \Psi - \omega t + 2\pi \Delta r/q$$

$$\phi(-1, -1) = \Psi - \omega t - 2\pi \Delta r/q$$

$$\phi(+1, -1) = \Psi + \omega t - 2\pi \Delta r/q$$

The intensity variations in the exit pupil of the objective system owing to interference of the first-order diagonal sub-beams with the zero-order sub-beam is converted into electrical signals by the detectors 13, 14, 15 and 16. The time-dependent output signals $S_{13}$, $S_{14}$, $S_{15}$, and $S_{16}$ of the detectors 13, 14, 15, and 16 may be represented by:

$$S_{13} = A \cos(\Psi + \omega t + 2\pi \Delta r/q)$$

$$S_{14} = A \cos(\omega - \omega t + 2\pi \Delta r/q)$$

$$S_{150} = A \cos(\Psi - \omega t - 2\pi \Delta R/q)$$

$$S_{16} = A \cos(\Psi + \omega t - 2\pi \Delta r/q)$$

where A is a constant.

As is shown in FIG. 2, the signals $S_{13}$ and $S_{16}$ are subtracted from each other and so are the signals $S_{14}$ and $S_{15}$. The signals at the outputs of the subtractor circuits 17 and 18 are given by:

$$S_{17} = S_{13} - S_{16} = -B \sin(\Psi + \omega t) \sin(2\pi \Delta r/q)$$

$$S_{18} = S_{14} - S_{15} = -B \sin(\Psi - t) \sin(2\pi \Delta r/q)$$

where B is again a positive constant. The signals $S_{17}$ and $S_{18}$ are subtracted from each other in the subtractor circuit 19. The output signals $S_{19}$ may be represented by:

$$S_{19} = -C \cos \Psi \cdot \sin(2\pi \Delta r/q) \cdot \sin \omega t$$

where C is again a positive constant. The component $\sin 2\pi \Delta r/q$ is an odd function of $\Delta r$, so that the signal $S_{19}$ contains information about both the magnitude and the direction of a centering error of the read spot relative to a track portion to be read. The component $\sin \omega t$ varies in time depending on the information stored in the track portion, but is dependent of a centering error $\Delta r$.

As is shown in FIG. 2 the output signals of the detectors 13 and 16 are added to each other in the circuit 21. The terms $\omega t$ in the signals $S_{13}$ and $S_{16}$ have the same sign, while the sign of the term $2\pi \Delta r/q$ in the signal $S_{13}$ is opposite to that of this term in the signal $S_{16}$. As a result, the variation in the sum of the signals $S_{13}$ and $S_{16}$ owing to centering errors will be substantially smaller than this variation in the signal $S_{17}$. The sum signals $S_{13} + S_{16}$ is mainly determined by the first orders which are diffracted in the track direction. This sum signal may be written as:

$$S_{21} = S_{13} + S_{16} = D \cos(\Psi + \omega t)(1 + m \cos 2\pi \Delta r/q)$$

wherein $m$ is a constant smaller than 1, so that the sign of $S_{21}$ cannot change owing to a centering error. Similarly, the sum signal $S_{14} + S_{15}$ may be written as:

$$S_{20} = E \cos(\Psi = \omega t)(1 + m \cos 2\pi \Delta r/q).$$

The signals $S_{20}$ and $S_{21}$ are applied to the subtractor circuit 24, at the output of which circuits the following signal is obtained.

$$S_{24} = -F \sin \Psi [1 + m \cos (2 \pi \Delta r/q) \sin \omega t] \quad 5$$

After multiplication in the circuit 22 this yields:

$$S_{22} = S_{19} \times S_{24} = G \cos \Psi \sin \Psi \sin (2 \pi \Delta r/q) [1 + m \cos (2 \pi \Delta r/q)] \sin^2 107 t$$

The component $\sin^2 \Psi t$ may be written as $\frac{1}{2} - \frac{1}{2} \cos (2 \Psi t)$; and the component $\sin \Psi \cos \Psi$ as $\frac{1}{2} \sin (2 \Psi)$, so that:

$$S_{22} = \sin 2 \Psi K (\Delta r) \sin (2 \pi \Delta r/q) [1 - \cos (2 \omega t)]$$

where $K = \frac{1}{4} G [1 + m \cos (2 \pi \Delta r/q)]$ and is always positive. In the above expression D, E, F and G are positive constants. The signal $S_{22}$ is finally passed through the low-pass filter 23, which only transmits frequencies lower than the frequency $2 \omega$, so that a signal $$S_r = \sin 2 \Psi K (\Delta r) \sin (2 \pi \Delta r/q) \text{ is obtained.}$$

As $\Psi$ is determined by the phase depth, which is constant for a specific record carrier, $\sin 2 \Psi$ is also a constant.

Consequently, the signal $S_r$ is an odd function of the centering error $\Delta r$, so that by means of the described detector arrangement and the described signal processing both the magnitude and the direction of the centering error is detected. The signal $S_r$ may be used for correcting the position of the read spot relative to the track portion to be read in a manner known per se, for example by tilting and mirror 9 in the direction of the arrow 10 (compare FIG. 1).

The components $K (\Delta r) \sin (2 \pi \Delta r/q)$ may be written as:

$$\frac{1}{4} G [\sin(2 \pi \Delta r/q) + (m/2) \sin (4 \pi \Delta r/q)].$$

In FIG. 5 the functions $\sin(2 \pi \Delta r/q)$ and $m/2 \sin (4 \pi \Delta r/q)$ are represented by the dashed curves $l_1$ and $l_2$ and the sum function by an uninterrupted curve $l_3$. This reveals that in the range around $\Delta r = 0$, which is important for servo control, the signal $m/2 \sin (4 \pi \Delta r/q)$ augments the signal $\sin (2 \pi \Delta r/q)$; the slope of the curve $l_3$ and $\Delta r = 0$ is steeper than that of the curve $l_1$.

It is to be noted that in the hatched areas in FIG. 4, the sub-beams which are diffracted in the X-direction overlap the sub-beams which are diffracted in the Y-direction. The output signals of the detectors 13, 14, 15 and 16 are therefore and only determined by the interference between the zero-order sub-beams and the first-order sub-beams which are diffracted in the diagonal direction but also by the interference between the first-order sub-beams which are diffracted in the track direction and in the direction transverse thereto, insofar these beams fall within the pupil of the objective system.

The difference in phase between for example the sub-beam $b(+1, 0)$ and the sub-beam $b(0, +1)$ may be represented by: $\omega t + 2 \pi \Delta r/q$. In this phase difference the phase angle $\Psi$ no longer occurs, because both the sub-beam $b(+1, 0)$ and the sub-beam $b(0, +1)$ exhibit a phase angle $\Psi$ relative to the zero order sub-beam $b(0, 0)$. Interference of the sub-beams $b(+1, 0)$, $b(0, +1)$, $b(-1, 0)$ and $b(0, -1)$ yields the following signals at the outputs of the detectors 13, 14, 15 and 16:

$$S'_{13} = \cos (\omega t - 2 \pi (\Delta r/q))$$

$$S'_{14} = \cos (- \omega t - 2 \pi (\Delta r/q))$$

$$S'_{15} = \cos (- \omega t + 2 \pi (\Delta r/q))$$

$$S'_{16} = \cos (+ \omega t + 2 \pi (\Delta r/q))$$

These signals are processed in a similar way as the signals $S_{13}$, $S_{14}$, $S_{15}$ and $S_{16}$, i.e.:

$$S'_{17} = S'_{13} - S'_{16} = +B' \sin \omega t \cdot \sin(2 \pi \Delta r/q)$$

$$S'_{18} = S'_{14} - S'_{15} = -B' \sin \omega t \cdot \sin(2 \pi \Delta r/q),$$

and $$S'_{19} = S'_{17} - S'_{18} = C' \sin 2 \pi \Delta r/q \sin \omega t$$

are determined, where B' and C' are positive constants. The signals $S_{19}$ and $S'_{19}$ do not counteract each other but amplify each other, so that the described centering error detection is possible if $-C \cos \Psi$ is positive, or $\cos \Psi$ is negative.

So far only first order sub-beams have been discussed. It is obvious that the information structure will also diffract radiation in higher orders. However, the radiation energy in the higher diffraction orders is substantially small, and the diffraction angles are such that only a small portion of the higher-order sub-beams falls within the pupil of the objective system. Therefore, the influence of the higher-order sub-beams may be neglected.

In order to enable a record carrier to be read with a specific optical system the spatial frequencies in the information structure should be within specific limits. FIGS. 3 and 4 show the situation in which the spatial frequencies in the track direction and transverse to the track direction, correspond to half the cut-off frequency of the optical read system. The modulation depth of the information signal $S_{24}$ is then a maximum and that of the centering error signal $S_r$ is substantially a maximum. When the spatial frequency of the pits in a track portion to be read increases, the first order sub-beams will be diffracted through a larger angle, i.e. the distance $f$ increases. At a specific spatial frequency, which corresponds to the cut-off frequency of the optical system, there will no longer be an overlap of the first-order sub-beams with the zero-order sub-beam and of the first-order sub-beams mutually. Then there will no longer be any interference in the area covered by the detectors, and it is no longer possible to derive an information signal. As the distances from the centers 36, 37, 38 and 39 to the center 35 are proportional to $\sqrt{e^2 + f^2}$ the highest spatial frequency of the pits in a track for which a centering error signal can be derived will be slightly lower, for example 15% lower than the highest spatial frequency for which an information signal $S_{24}$ can be obtained. On the other hand, if the spatial frequency of the pits approximates to zero, the distance $f$ will also approximate to zero. The various first order sub-beams are than no longer separated, so that it is no longer possible to obtain an information signal. The lowest value of the spatial frequency of the pits for which a centering error signal can be derived is slightly smaller than that value of which an information signal can still be obtained. The lower limit for the spatial frequency on the record carrier for which a centering error signal can still be obtained is that spatial frequency for which it is still possible to derive an information signal.

It is evident that the same remarks can be made with respect to the spatial frequency of the information structures in the direction transverse to the track direction.

Hence, there is an optimum value for the spatial frequency of the information structure in the track direction and in the direction transverse thereto for which an optimum centering error signal is obtained. However, there is a wide range of spatial frequencies around the optimum value within which it is possible to derive an information signal and a centering error signal with a satisfactory signal-to-noise ratio.

In the apparatus of FIG. 2 the signals from the left-hand and the right-hand part of the exit pupil are subtracted from each other for deriving the information signal ($S_{24}$). This apparatus is in particular suitable for reading a record carrier with a small phase depth or a small pit-depth. In the expression for $S_r$ sin $2 \Psi$ then reaches an extreme value for $\Psi = 3\pi/4$, , whereas cos $\Psi$ is then negative.

For reading a record carrier with a greater phase depth it is preferable to add the signals of the left-hand and the right-hand part of the exit pupil to each other. For this purpose, the subtractor circuit 24 in the arrangement of FIG. 2 might be replaced by an adder circuit 24′ (represented by dashed lines in FIG. 2). In addition between this adder circuit and the multiplier circuit a phase-shifting circuit, for example a differentiating network 25 (represented by dashed lines in FIG. 2) must be included. However, it is then also possible to add the output signals of the detectors 13 and 15 and those of the detectors 14 and 16 to each other. The signal processing circuit may then be simplified, as is shown in FIG. 6.

Figure 6:
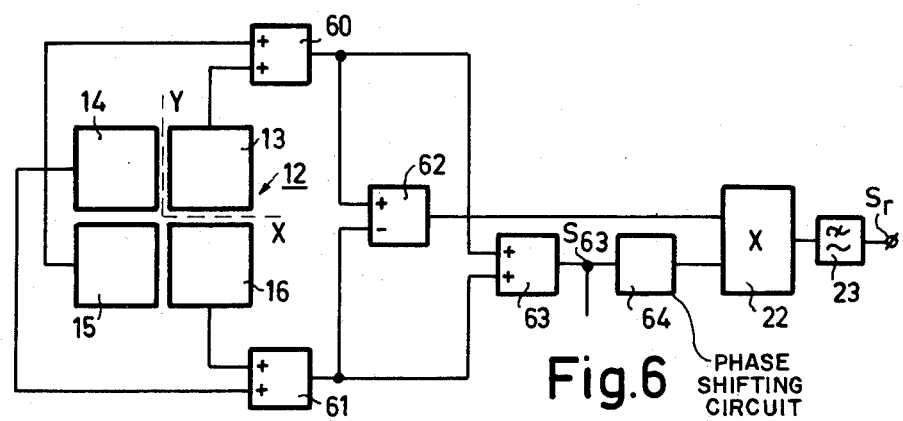

In the circuit arrangement in accordance with FIG. 6 the following signals are determined:

$$S_{60} = S_{13} + S_{15} = B_1 \cos \Psi \cos (\omega t + 2 \pi(\Delta r/q))$$

$$S_{61} = S_{14} + S_{16} = B_1 \cos \Psi \cos (\omega t - 2 \pi(\Delta r/q))$$

$$S_{62} = S_{60} - S_{61} = -C_1 \cos \Psi \sin(2 \pi (\Delta r/q)) \sin \omega t$$

$$S_{63} = S_{60} + S_{61} = D_1 \cos \Psi [1 + m \cdot \cos(2 \pi(\Delta r/q))] \cos \omega t$$

The components in the equations for $S_{62}$ and $S_{63}$ which vary with $\omega t$ are $\pi/2$ phase shifted relative to each other, so that again one of the signals $S_{62}$ and $S_{63}$ should be passed through a phase-shifting circuit. This circuit could be a differentiating network. (Compare the element 25 in FIG. 2). However, preferably the phase shifting circuit 64 takes the form of a so-called phase-locked loop.

Figure 6A:
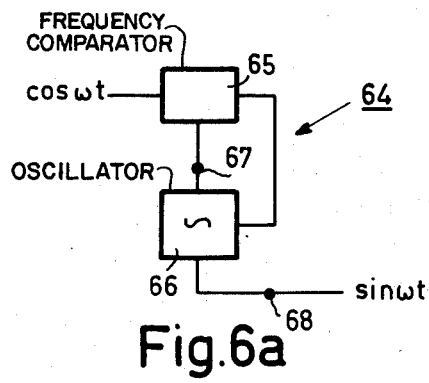

FIG. 6a shows the circuit diagram of such a circuit arrangement. The reference numeral 66 designates an oscillator which provides a cosine function at its output 67 and a sine function at its output 68. The output 67 is connected to a first input of a frequency comparator 65 in which the frequency of the oscillator 66 is compared with the frequency of the signal cos $\omega t$, whose phase is to be shifted through 90°. The output signal of the comparator 65 is fed back to the oscillator, so that the frequency of this oscillator becomes equal to that of the signal cos $\omega t$. A sine function with the desired frequency $\omega$ is then obtained at the output 68 of the oscillator.

Consequently, the circuit 64 converts the signal $S_{63}$ into a signal:

$$S_{64} = -E \cdot \cos \Psi [1 + m \cdot \cos(2 \pi (\Delta r/l))] \sin \omega t$$

Multiplication of the signals $S_{62}$ and $S_{64}$ and filtering of the product signal yields $$S_r = K_1 (\Delta z) \cdot \cos^2 \Psi \cdot \sin (2 \pi (\Delta r/q))$$

where $K_1$ is again a function of $\Delta z$ is always positive. $B_1$, $C_1$, $D_1$ and $E_1$ are positive constants. $S_r$ is again an odd function of the centering error $\Delta z \cdot \cos^2 \Psi$ is maximum for a phase depth $\Psi = \pi$ so that the apparatus of FIG. 6 is suitable for reading a record carrier with a large phase depth, and also for a record carrier with an amplitude structure, whose phase depth may be assumed to be $\pi$ radians.

Figure 7:
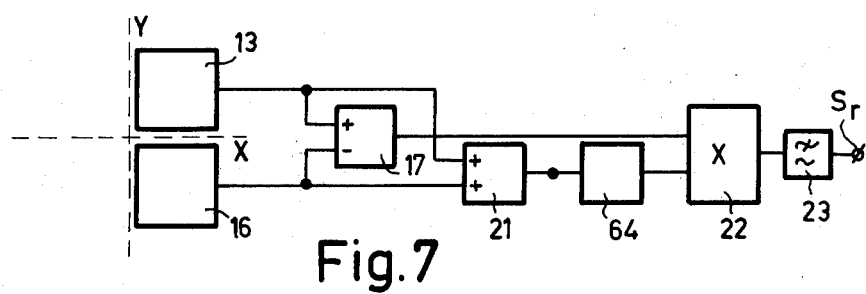

Instead of using the entire exit pupil it would also be possible to use only half the exit pupil. An arrangement which is suitable for this is shown in FIG. 7. From the preceding it will be evident that the following equations are valid for the arrangement of FIG. 7:

$$S_{17} = S_{13} - S_{16} = -B_2 \sin (\Psi + \omega t) \cdot \sin(2 \pi(\Delta r/q))$$

$$S_{21} = S_{13} + S_{16} = D_2 \cos (\Psi + \omega t) \cdot [1 + m \cos(2 \pi(\Delta r/q))]$$

After a phase shift through $\pi/2$ of $S_{21}$ multiplication of the phase-shifted signal by $S_{17}$ thus yields:

$$S_{22} = G_2[\tfrac{1}{2} - \tfrac{1}{2} \cos 2(\Psi + \omega t)] \cdot \sin(2 \pi(\Delta r/q)) \cdot [1 + m \cos (2 \pi(\Delta r/q))] \cdot$$

Filtering this signal yields the signal $S_r$, which may be written as:

$$S_r = K_2 (\Delta r) \cdot \sin 2 \pi (\Delta r/q)$$

$B_2$, $D_2$ and $G_2$ are positive constants. $K_2$ is a positive function of $\Delta r$, so that $S_r$ is an odd function of $\Delta r$. This expression for $S_r$ does not contain any function of $\Psi$, so that the apparatus of FIG. 7 is suitable for reading both record carriers with a small phase depth and record carriers with a large phase depth.

It is to be noted that when signals from the entire exit pupil are used, the signal-to-noise ratio for the information signal and the centering error signal is better than in the case that only the signals from half the exit pupil are used.

The invention has been described by way of example with reference to a round disc-shaped record carrier with a radiation-reflecting information structure. It will be obvious that it is also possible to read radiation-transmitting record carriers with an apparatus in accordance with the invention. The record carrier need not be round and disc-shaped, but may also be a record carrier in the form of a tape with a multitude of information tracks.

In respect of the information structure, it is to be noted that the only requirement is that this structure should be readable by optical means. This structure may be a pit structure, a black white structure, or for example, a magneto-optical structure. Apart from a television program the record carrier may for example also store digital information for a computer.

For determining centering errors use is made of the pattern of the interference lines in the pupil of the objective system, which pattern is produced by interference between the zero-order sub-beam and the first-order sub-beams. The phase of the line pattern relative to the detectors is determined by the degree in which the read spot is centered relative to a track to be read. The spatial frequency of the line pattern, however, is determined by the degree in which the read beam is focused at the plane of the information structure. For large focusing errors this period is small and for small focusing errors this period is large. The manner in which the focussing is corrected is irrelevant for the present invention and is therefore not discussed. However, it is to be noted that the focusing errors may influence the choice of the shape of the detectors in FIG. 7.

It has been assumed hereinbefore that the detectors 13 and 16 are rectangular detectors. The response of a rectangular detector to a line-shaped intensity pattern is a curve which varies in accordance with $sinx/x$, $1/x$ being equal to the spatial period of the line pattern. This response curve has a value of zero if this spatial period equals the width of the detector. In that case this detector will always "view" one period of the line pattern independently of the phase of the line pattern, and thus independently of the centering. When for larger focusing errors the spatial period of the intensity pattern becomes smaller than the width of the detector, the response curve will have a negative portion. This means that the servo system for centering might move the read spot in the wrong direction and that a possible centering error would increase. When using rectangular detectors there is a risk, owing to the occurrence of focusing errors, that the servo system for centering causes the center of the read spot not to remain on the center line of a track portion to be read but to be projected at a fixed distance from said center line.

Figure 8:
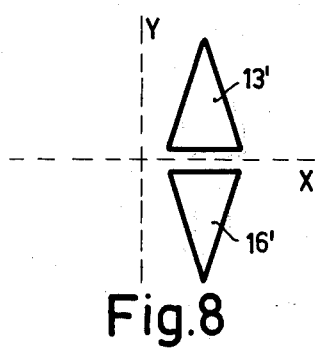

This problem may be overcome by using triangular detectors instead of rectangular detectors. FIG. 8 shows a couple of such detectors 13' and 16' which may replace the detectors 13 and 16 of FIG. 7. The response curve of the triangular detectors is in accordance with $(sinx/x)^2$ and consequently has no negative portion.

It is evident that the said problem does not occur if the read apparatus is provided with a servo-control which ensures that the read spot always remains correctly focused at the information structure.

What is claimed is:

1. Apparatus for reading a record carrier on which information is stored in an optically readable track-shaped information structure, which apparatus is of the type comprising a radiation source, an objective system means for passing radiation emitted by the radiation source to a radiation-sensitive information detection system via the record carrier, the detection system comprising means for converting a read beam which is supplied by the radiation source and modulated by the information structure into an electrical signal, and which apparatus furthermore comprises a centering detection system which is connected to an electronic circuit for deriving a control signal for correcting the centering of the read beam relative to a track portion to be read, the improvement wherein the centering detection system and the information detection system are constituted by an even number of at least two and at most four radiation-sensitive detectors which are situated in the far field of the information structure in separate quadrants of an imaginary X-Y coordinate system, whose origin is disposed on the optical axis of the objective system and whose X-axis effectively extends in the track direction and whose Y-axis effectively extends transversely to the track direction, that the outputs of two detectors which are disposed at the same side of the Y-axis are connected to both a subtractor circuit and an adder circuit, that a multiplier circuit is provided to whose inputs signals derived from the subtractor circuit and from the adder circuits are applied, and that the output of the multiplier circuit is connected to a filter circuit which only transmits frequencies lower than the frequency which corresponds to twice the average spatial frequency of the information structure in the track direction, at the output of which filter circuit a control signal for correcting the centering of the read beam is obtained.

2. Apparatus for reading a moving record carrier on which information is recorded in the form of an optically readable track-shaped information structure, said apparatus comprising radiation source means for providing a radiation beam, a centering and information detecting system, objective system means for directing the radiation beam to a selected track on said record carrier and for directing the beam from said record carrier to said centering and information detecting system, said record carrier comprising means for modulating said radiation beam, the detection system comprising four radiation-senstive detectors situated in the far field of the information structure in separate quadrants of an imaginary X-Y coordiante system, whose origin is disposed on the optical axis of the objective system and whose X-axis effectively extends in the track direction and whose Y-axis effectively extends transversely to the track direction, a first subtractor circuit connected to outputs of a first two of said radiation-sensitive detectors situated on one side of the Y-axis, a first adder circuit connected to the outputs of said first two of said radiation-sensitive detectors, a second subtractor circuit connected to a second two of said radiation-sensitive detectors on the other side of said Y-axis, a second adder circuit connected to said second two radiation-sensitive detectors, a multiplier circuit, coupling means connecting said first and second adder circuits and said first and second subtractor circuits to inputs of said multiplier, and a filter circuit connected to an output of said multiplier and providing an output signal consisting of only those frequencies from said multiplier that are lower than the frequency which corresponds to twice the average spatial frequency of the information structure in the track direction multiplied by the track velocity, said filter output comprising a centering error signal, while an electrical signal corresponding to said information is provided on either input of said multiplier circuit.

3. Apparatus as recited in claim 2, wherein said coupling means comprises a third subtractor circuit having inputs connected to outputs of said first and said second subtractor circuits and having an output connected to a first input of said multiplier circuit, and a further subtractor circuit having inputs connected to outputs of said first and second adder circuits and having an output connected to a second input of said multiplier circuit.

4. Apparatus for reading a moving record carrier on which information is recorded in the form of an optically readable track-shaped information structure, said apparatus comprising radiation source means for providing a radiation beam, a centering and information detecting system, objective system means for directing the radiation beam to a selected track on said record carrier and for directing the beam from said record carrier to said centering and information detection system, the information structure on said record carrier comprising means for modulating said radiation beam, the detection system comprising four radiation-sensitive detectors situated in the far field of the information structure in separate quadrants of an imaginary X-Y coordinate system, whose origin is disposed on the optical axis of the objective system and whose X-axis effectively extends in the track direction and whose Y-axis effectively extend transversely to the track direction, a subtractor circuit, an adder circuit, a second adder circuit having inputs connected to the radiation-sensitive detectors in the first and third quadrants of said four quadrant coordinate system and having an output connected to first inputs of said first adder circuit and said first subtractor circuit, a third adder circuit having inputs connected to the second and fourth radiation-sensitive detectors in said four quadrant system and having an output connected to second inputs of said first adder circuit and said first subtractor circuit, a multiplier circuit, means connecting outputs of said first adder circuit and said first subtractor circuit to inputs of said multiplier circuit and for relatively phase shifting said outputs of said first adder circuit and said first subtractor circuit, and a filter circuit connected to an output of said multiplier circuit and passing only those frequencies from said multiplier circuit that are lower than the frequency which corresponds to twice the average spatial frequency of the information structure in the track direction multiplier by the track velocity, the output of said filter circuit comprising a centering signal, while the output of said first adder circuit comprises an electrical signal corresponding to said information.

5. Apparatus for reading a moving record carrier on which information is recorded in the form of an optically readable track-shaped information structure, said apparatus comprising radiation source means for providing a radiation beam, a centering and information detection system, objective system means for directing the radiation beam to a selected track on said record carrier and for directing the beam from said record carrier to said centering and information detection system, the detection system comprising two radiation-sensitive detectors situated in the far field of the information structure on one side of a Y-axis in separate quadrants of an imaginary X-Y coordinate system, whose origin is disposed on the optical axis of the objective system means and whose X-axis effectively extends in the track direction and whose Y-axis effectively extends transversely to the track direction, a subtractor circuit having inputs connected to each of said two radiation-sensitive detectors, an adder circuit having inputs connected to each of said two radiation-sensitive detectors, a multiplier circuit, means connecting inputs of said multiplier circuit to outputs of said adder circuit and said subtractor circuit and for relatively phase shifting the outputs of said adder circuit and said subtractor circuit, and a filter circuit connected to an output of said multiplier circuit and providing an output signal consisting of only those frequencies from said multiplier circuit that are lower than the frequency which corresponds to twice the average spatial frequency of the information structure in the track direction multiplied by the track velocity, said filter output comprising a centering error signal, while an electrical signal corresponding to said information is provided on either input of said multiplier circuit.

6. Apparatus for reading a moving record carrier as recited in claim 9, wherein each of said two radiation-sensitive detectors has the shape of an isosceles triangle having a base parallel to the X-axis of said coordinate system.

* * * * *

UNITED STATES PATENT AND TRADEMARK OFFICE
CERTIFICATE OF CORRECTION

PATENT NO. : 4,057,833
DATED : November 8, 1977
INVENTOR(S) : JOSEPHUS J.M. BRAAT It is certified that error appears in the above-identified patent and that said Letters Patent are hereby corrected as shown below:

Col. 3, line 35, after "6a" should be -- , --(a comma);

Col. 4, line 26, "different" should be --diffracted--;

Col. 5, line 54, after "relative" should be --to--;

Col. 6, line 23, "$S_{14} = A \cos (\omega -$" should be --$S_{14} = A \cos (\psi -$ --;

line 24, "$S_{150} = A \cos (\psi - \omega t - 2\pi \Delta R1q)$" should be

--$S_{15} = A \cos (\psi - \omega t - 2\pi \Delta r/q)$--;

line 35, "$(\psi - t)$" should be --$(\psi - \omega t)$--;

line 63, "wherein" should be --where--;

Col. 7, line 2, "circuits" should be --circuit--;

line 10, "107" should be --$\omega$--;

line 11, "$\psi t$" should be --$\omega t$--;

line 12, "$\psi t$" should be --$\omega t$--;

line 51, "and" second occurence should be --not--;

UNITED STATES PATENT AND TRADEMARK OFFICE
CERTIFICATE OF CORRECTION

PATENT NO. : 4,057,833
DATED : November 8, 1977
INVENTOR(S) : JOSEPHUS J.M. BRAAT It is certified that error appears in the above-identified patent and that said Letters Patent are hereby corrected as shown below:

Col. 10, line 7, after "of $\Delta z$" should be --and--;

Claim 6, line 2, "9" should be --5--;

Signed and Sealed this

Eighteenth Day of July 1978

[SEAL]

Attest:

RUTH C. MASON
Attesting Officer

DONALD W. BANNER
Commissioner of Patents and Trademarks